United States Patent [19]

Komine

[11] Patent Number: 4,494,147

[45] Date of Patent: Jan. 15, 1985

[54] VIDEO CAMERA

[75] Inventor: Yoshio Komine, Kanagawa, Japan

[73] Assignee: Canon Kabushiki Kaisha, Tokyo, Japan

[21] Appl. No.: 364,889

[22] Filed: Apr. 2, 1982

[30] Foreign Application Priority Data

Apr. 16, 1981 [JP] Japan .................................. 56-57449

[51] Int. Cl.³ ............................................. H04N 5/26
[52] U.S. Cl. .................................... 358/209; 358/217; 358/224; 358/229
[58] Field of Search .............. 358/209, 217, 224, 225, 358/229, 41, 55; 352/66, 94

[56] References Cited

U.S. PATENT DOCUMENTS

| 2,315,406 | 3/1943 | Eddy | 358/224 |
| 2,525,290 | 10/1950 | Edwards | 358/224 |
| 2,547,030 | 4/1951 | Luckock | 358/224 |
| 2,709,391 | 5/1955 | Reeves | 358/224 |
| 3,659,045 | 4/1972 | Siebert | 358/229 |
| 4,318,133 | 3/1982 | Ohtake | 358/229 |
| 4,368,490 | 1/1983 | Takimoto | 358/217 |

FOREIGN PATENT DOCUMENTS 129123  4/1977  Japan .................................. 358/209

OTHER PUBLICATIONS

Compact TV Camera FAE 123 with Electronic Viewfinder, by W. Knorr, Grundig Technische Informationen, Mar. 1977, pp. 139–151.

TK-760 Camera A Design Evolution, by Bazin, RCA Broadcast New (USA), No. 164w, (Jun. 1978), pp. 38–42.

Primary Examiner—Tommy P. Chin
Attorney, Agent, or Firm—Toren, McGeady and Stanger

[57] ABSTRACT

Disclosed is a video camera in which the CRT of the electronic view finder is disposed in the hand grip.

1 Claim, 5 Drawing Figures

VIDEO CAMERA

BACKGROUND OF THE INVENTION

1. Field of the Invention

The present invention relates to a video camera with an electronic view finder.

2. Description of the Prior Art

Until now, the electronic view finder has been used as the finder for a video camera. As the electronic view finder, the very small cathode ray tube (CRT) is used to reproduce the white-black image which is enlarged and directly observed with the eye piece lens.

In the case of recently developed home video cameras a solid image pick up device is most commonly used to reduce the weight making the camera body more and more compact. Under these circumstances, the size of the CRT and the associated electronic circuit of the electronic view finder play an important part of the camera as a whole.

Although a video camera with an optical finder may be considered, the efficiency of an electronic view finder is superior thereto so that it is preferred to provide the video camera with an electronic view finder. Consequently, it has been an important problem for the home video camera to realize a compact electronic view finder and to combine it with the camera body.

SUMMARY OF THE INVENTION

An object of the present invention is to provide a video camera with the above-mentioned compact electronic view finder.

Another object of the present invention is to provide a video camera with an electronic view finder which is excellent in operability and portability, more precisely a video camera so designed that the CRT for the electronic view finder is built into the grip, indispensable for hand operation.

Another object of the present invention is to provide a video camera so designed that the grip in which the electronic view finder is built is rotatable in a direction parallel to the optical axis of the lens.

Further objects of the present invention will be obvious from the detailed descriptions made below with reference to the accompanying drawings.

In one form of the invention a video camera includes an image pickup means for converting an object image into an electrical signal, a cathode ray tube for producing a display with the electrical signal obtained from the image pickup means, an eye piece part for visually recognizing an image picture displayed on the cathode ray tube, and a grip for holding the camera having the cathode ray tube disposed therein.

In some forms of the invention the apparatus may further include a reflecting optical system for directing the image picture displayed on the cathode ray tube to an eye piece part. The image pickup means may include a lens system and the grip may be rotatable in such a manner that the grip becomes substantially parallel to the optical axis of the lens.

In other forms of the invention the apparatus may also include a first casing for holding the eye piece part and the grip and a second casing for holding the image pickup means, and a rotary connector for rotatably connecting the first casing to the second casing.

DESCRIPTION OF THE PREFERRED EMBODIMENT

Figure 1:
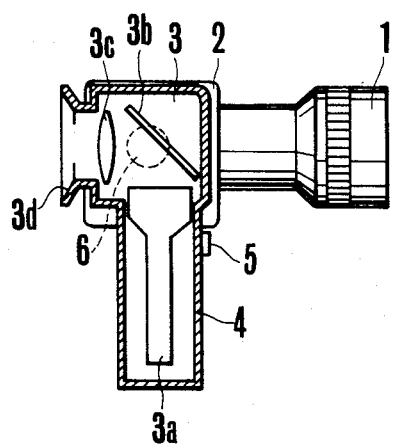
FIG. 1 shows a sectional view of an embodiment of the video camera in accordance with the present invention with the electronic view finder built in the grip.

An embodiment of the present invention will be explained in detail in accordance with the accompanying drawings. In FIGS. 1 to 5, the photographing lens is identified by the reference numeral 1 and the image pick up 2 contains the solid image pick up element such as CCD. The finder 3 consists of the small CRT 3a, the mirror 3b, the eye piece lens 3c, the eye piece hood 3d, the camera grip 4 and the trigger switch 5 for starting and stopping the camera. The rotary connector 6 rotatably connects the finder 3 to the image pick up 2.

Figure 2:
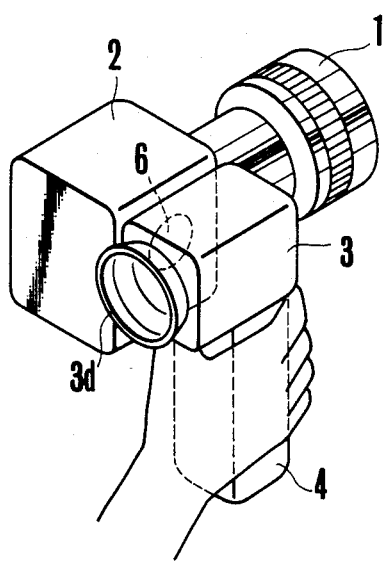
FIG. 2 shows a perspective view of the video camera in FIG. 1 in use.

FIGS. 1 and 2 show the camera during photography. At this time the image formed on the screen of the CRT 3a goes toward the rear of the camera by means of the mirror 3b and is enlarged with the eye piece lens 3c to be observed. At the time of photographing, as is shown in FIG. 2, the photographer holds the camera 4 with the grip 4, and operates the trigger switch 5 to start and stop the camera.

Figure 3:
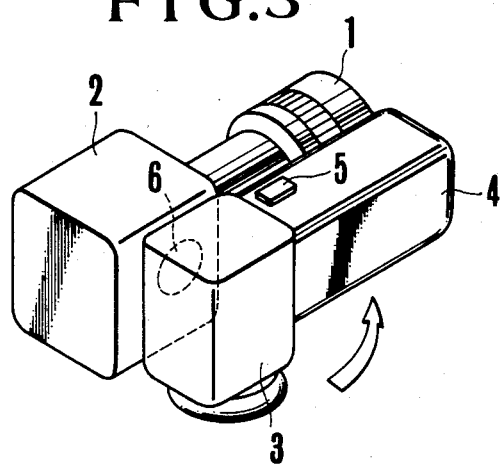
FIG. 3 shows a perspective view of the video camera ready for carrying or storage.

When the camera is not used, as is shown in FIG. 3, the grip 4 is rotated around the rotary connector 6 in the direction of the arrow by 90° and is folded in a position parallel to the optical axis of the lens 1.

Figure 4:
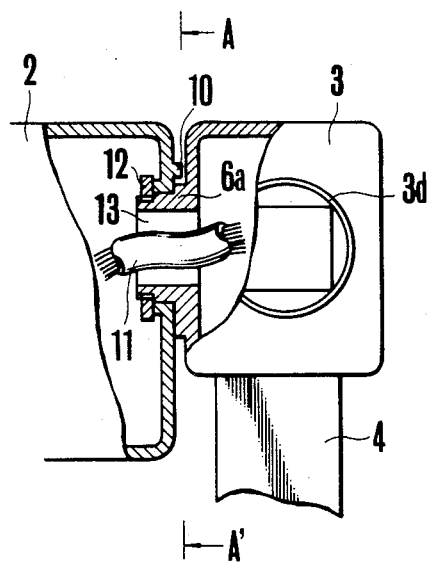
FIG. 4 shows a partial sectional view, in detail of the rotary connector between the finder and the camera body.
Figure 5:
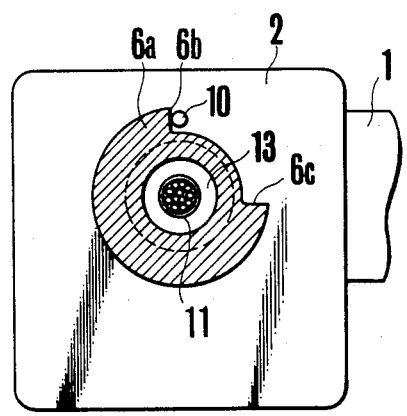
FIG. 5 shows a section of FIG. 4 along the line A—A'.

The construction of the rotary connector 6 will be explained below in detail in accordance with FIGS. 4 and 5.

In the drawing, there is shown a cylindrical projection 6a of the finder notches 3, 6b and 6c, and a holding pin 10 provided on the casing of the image pick up 2. A signal cable 11 is also shown with a connector ring 12 secured in the screw at the end of the projection 6a and a hole 13.

By mounting the connector ring 12 at the end of the cylindrical projection 6a of the finder 3, the finder 3 is rotatable to the image pick up 2. However, the rotation angle of the finder 3 to the image pick up 2 is limited to about 90° because the image pick up 2 is provided with the holding pin 10, while the projection 6 is provided with the notches 6b, and 6c. Namely, when the holding pin 10 is in contact with the notch 6b the lengthwise direction of the grip 4 is almost perpendicular to the optical axis of the lens 1, while when the holding pin 10 is in contact with the notch 6c the lengthwise direction of the grip 4 coincides with that of the optical axis of the lens 1.

Furthermore, when the signal cable is in the hole 13, the image signal from the image pick up 2 is transmitted to the CRT 3a via the cable 11. Besides the image signal the power and the synchronization signal are also transmitted.

Although in the above embodiment the lengthwise direction of the grip 4 coincides with that of the optical axis of the photographing lens when the video camera is used, it is also possible to design the camera in such a manner that the grip is inclined forwards when the camera is used. Furthermore, although in the present embodiment the grip 4 and the eye piece are in the same casing, it is also possible to provide the grip 4 containing the CRT separate from the eye piece of the finder 3, whereby it is sufficient that only the grip 4 is rotated parallel to the optical axis of the lens.

Although in the present invention the image on the CRT screen is reflected on the mirror and led to the eye piece lens, it is necessary that the image observed from the eye piece part should be the same as that on the image pick up plane, which can be realized by properly selecting the scanning direction of the optical system of the electronic view finder or the CRT. Furthermore, if the grip 4 is inclined forwards it is possible to obtain the same image by properly selecting the finder optical system.

By arranging the electronic view finder in the grip of the video camera of the present invention, a better balanced grip can be obtained along with the realization of a more compact camera body than that of the conventional device in which the electronic view finder is independently arranged in the camera body. Furthermore, since the grip can be folded when the camera is not used, the operability and portability of the home video camera are excellent.

The present invention is not limited to the above embodiment but can be applied and modified in many ways within the gist of the claims.

What is claimed is:

1. A video camera comprising:
    a lens system for forming an object image;
    image pick up means for converting the object image into an electrical signal;
    a cathode ray tube responsive to the electrical signal for producing a display;
    finder means for visually recognizing an image picture displayed on said cathode ray tube;
    reflecting optical means, disposed between said cathode ray tube and said finder means, for directing the image picture on said cathode ray tube to said finder means;
    a grip casing for supporting the camera and for holding said cathode ray tube, said reflecting optical means and said finder means;
    a first casing for holding said image pick up means and said lens system;
    rotary connecting means for rotatably connecting said first casing and said grip casing and for including an opening through which a cable for transmitting the electrical signal obtained in said image pick up means to the cathode ray tube passes; and
    a limiting member for limiting the rotation angle of said rotary connecting means between the position at which a longitudinal direction of said first casing is almost parallel to that of said grip casing and that at which the longitudinal direction of said first casing is almost vertical to that of said grip casing.

* * * * *